(12) United States Patent
Arnold et al.

(10) Patent No.: US 9,188,219 B2
(45) Date of Patent: Nov. 17, 2015

(54) PROCEDURE FOR OPERATING A TRANSMISSION DEVICE, PARTICULARLY A 9-SPEED-TRANSMISSION

(71) Applicant: ZF Friedrichshafen AG, Friedrichshafen (DE)

(72) Inventors: Jorg Arnold, Immenstaad (DE); Georg Mihatsch, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 64 days.

(21) Appl. No.: 14/155,492

(22) Filed: Jan. 15, 2014

(65) Prior Publication Data
US 2014/0236439 A1 Aug. 21, 2014

(30) Foreign Application Priority Data

Feb. 20, 2013 (DE) .......................... 10 2013 202 708

(51) Int. Cl.
*F16H 61/02* (2006.01)
*F16H 61/686* (2006.01)
(Continued)

(52) U.S. Cl.
CPC ............ *F16H 61/0213* (2013.01); *F16H 61/12* (2013.01); *F16H 61/686* (2013.01); *F16H 2059/6807* (2013.01); *F16H 2061/1204* (2013.01); *F16H 2061/1272* (2013.01); *F16H 2200/0065* (2013.01);
(Continued)

(58) Field of Classification Search
CPC ...................... F16H 2061/161; F16H 2061/168
See application file for complete search history.

(56) References Cited

U.S. PATENT DOCUMENTS

| 5,486,147 A * | 1/1996 | Sakakiyama et al. .......... 477/125 |
| 6,275,760 B1 * | 8/2001 | Saito et al. ...................... 701/55 |
| 6,343,520 B1 * | 2/2002 | Ohashi et al. ................... 74/335 |

(Continued)

FOREIGN PATENT DOCUMENTS

| DE | 100 38 195 A1 | 2/2002 |
| DE | 10 2005 002 337 A1 | 8/2006 |

(Continued)

OTHER PUBLICATIONS

German Search Report Corresponding to 10 2013 202 707.9 mailed Oct. 21, 2013.

(Continued)

*Primary Examiner* — Edwin A Young
(74) *Attorney, Agent, or Firm* — Davis & Bujold, P.L.L.C.; Michael J. Bujold

(57) ABSTRACT

A method of operating a transmission device. At least one of the shift elements is a form-locking shift element. A sensor is associated with the form-locking shift element which can determine an operating state of the form-locking shift element. When a request to disengage the form-locking shift element occurs, a disengagement control signal is generated and the form-locking shift element is actuated in the direction of disengagement, depending on the disengagement control signal. The transmission device is transferred to a safe operating state in which the transmission output shaft can rotate, when an actuating pressure that changes the operating state of the form-locking shift element is determined with the sensor, even though a disengagement control signal was not generated, and/or when the sensor is associated with at least two form-locking shift elements and the form-locking shift elements are subjected to actuating pressure to implement a requested operating state change.

12 Claims, 3 Drawing Sheets

(51) Int. Cl.
*F16H 61/12* (2010.01)
*F16H 59/68* (2006.01)

(52) U.S. Cl.
CPC .. *F16H 2200/201* (2013.01); *F16H 2200/2046* (2013.01); *F16H 2200/2094* (2013.01)

(56) References Cited

U.S. PATENT DOCUMENTS

| | | | |
|---|---|---|---|
| 7,789,792 | B2 | 9/2010 | Kamm et al. |
| 8,398,522 | B2 | 3/2013 | Bauknecht et al. |
| 2002/0046617 | A1* | 4/2002 | Inagawa et al. ............ 74/335 |
| 2009/0250310 | A1* | 10/2009 | Popp et al. ............ 192/85 R |
| 2013/0047739 | A1 | 2/2013 | Schmidt et al. |

FOREIGN PATENT DOCUMENTS

| | | |
|---|---|---|
| DE | 10 2008 000 429 A1 | 9/2009 |
| DE | 10 2010 028 762 A1 | 11/2011 |
| DE | 10 2011 007 246 A1 | 10/2012 |
| DE | 10 2011 017 741 A1 | 10/2012 |
| DE | 10 2011 078 085 A1 | 12/2012 |

OTHER PUBLICATIONS

German Search Report Corresponding to 10 2013 202 708.7 mailed Oct. 21, 2013.

* cited by examiner

PROCEDURE FOR OPERATING A TRANSMISSION DEVICE, PARTICULARLY A 9-SPEED-TRANSMISSION

This application claims priority from German patent application serial no. 10 2013 202 708.7 filed Feb. 20, 2013.

FIELD OF THE INVENTION

The invention relates to a method for operating a transmission device, in particular a 9-speed transmission.

BACKGROUND OF THE INVENTION

Document DE 10 2005 002 337 A1 makes known a transmission device, which is designed as an 8-speed, multi-stage transmission having friction-locking shift elements, such as multi-disk clutches and multi-disk brakes. In the event of a shift request for a transmission ratio change in the transmission device, at least one friction-locking shift element— which is engaged in the power flow of the transmission device in order to implement the actual transmission ratio currently engaged in the transmission device—must be disengaged from the power flow of the transmission device, while at least one further friction-locking shift element—which is disengaged from the power flow of the transmission device during the implementation of the actual transmission ratio currently engaged in the transmission device—must be engaged into the power flow of the transmission device in order to implement the requested actual transmission ratio.

Therein, the torque that is transferred via the friction-locking shift element engaged in the power flow in order to implement the current actual transmission ratio of the transmission device is transferred—more or less, as the shift time increases—from the friction-locking shift element to be engaged into the power flow of the transmission device in order to implement the requested target transmission ratio, while the torque that can be transferred via the shift element to be disengaged decreases.

In general, in the event of a request to disengage a friction-locking shift element independently of the torque currently transferred via the friction-locking shift element, it can be assumed that the friction-locking shift element actually transitions into the disengaged operating state, which is why a simple software-based evaluation of a control current of a pressure controller of a friction-locking switching element is sufficient. Upon detection of a corresponding disengagement control signal for transferring a friction-locking shift element to the disengaged operating state, it is possible to easily verify, by means of the aforementioned evaluation, whether a shift or gear-disengagement procedure that includes disengagement of a friction-locking shift element was successful. Given a suitable design of the components of a friction-locking shift element, for example a spring preload, friction-locking shift elements also actually transition into the disengaged operating state with a high degree of probability, provided the pressure controller of the friction-locking shift elements is actuated correctly with a disengagement control signal.

Disadvantageously, friction-locking shift elements in the disengaged operating state cause drag torques, however, which lower an overall efficiency of an automatic transmission to an unwanted extent.

For this reason, transmission devices such as that known from DE 10 2008 000 429 A1, are also being designed to an increasing extent not only with friction-locking shift elements but also with form-locking shift elements, wherein no drag torques occur in the region of these form-locking shift elements in the disengaged operating state that can lower the overall efficiency of a transmission device.

It must be taken into account, however, that form-locking shift elements, as compared to friction-locking shift elements, must be close to the synchronization point in order to be switched from a disengaged operating state, in which torque cannot be transferred via the form-locking shift elements, into the engaged operating state, in which all the available torque can be transferred via the form-locking shift elements. In addition, form-locking shift elements engaged in the power flow of a transmission device must be close to the load-free operating state in order to be disengaged from the power flow with low shifting forces. During shift procedures or so-called gear-disengagement procedures, a power flow between a transmission input shaft and a transmission output shaft must be interrupted in the region of a transmission device. Therein, a form-locking shift element must be transferred from the engaged operating state to the disengaged operating state. Under certain circumstances, the form-locking shift element cannot be transferred to the disengaged operating state due to an excessively rapid or faulty build-up of the torque present in the region of the form-locking shift element, for example during an upshift or a faulty reduction of the torque that is present, for example, during a gear disengagement. It is also possible for mechanical, hydraulic, or electrical malfunctions to prevent the disengagement of a form-locking shift element, which is why, if a corresponding disengagement control signal is present, form-locking shift elements, as opposed to friction-locking shift elements, do not necessarily transition into a disengaged operating state and a gear set of a transmission device is in an overdetermined operating state, which is unwanted, or a requested interruption of the power flow cannot be implemented in the region of a transmission device.

SUMMARY OF THE INVENTION

The problem addressed by the present invention is therefore that of providing a method for operating a transmission device, in particular a 9-speed transmission, which can be transferred into various operating states by actuating shift elements, wherein at least one of the shift elements is designed as a form-locking shift element, which is transferred from an engaged operating state to a disengaged operating state in order to implement a defined operating state of the transmission device during which a power flow between a transmission input shaft and a transmission output shaft is present or is interrupted, wherein undefined operating states of a transmission device, such as an overdetermined gear set or an unwanted power flow in the region of a transmission device, can be easily prevented by means of this method.

This problem is solved according to the invention by a method as described below.

In the method according to the invention for operating a transmission device, in particular a 9-speed transmission, which can be transferred into various operating states by actuating shift elements, wherein at least one of the shift elements is designed as a form-locking shift element, which is transferred from an engaged operating state to a disengaged operating state in order to implement a defined operating state of the transmission device during which a power flow between a transmission input shaft and a transmission output shaft is present or is interrupted, wherein a sensor device is associated with the form-locking shift element, wherein an operating state of the form-locking shift element can be detected by means of this sensor device and, if there is a request to disengage the form-locking shift element, a disengagement control signal is generated and the form-locking shift element is actuated in the direction of disengagement depending on the disengagement control signal.

According to the invention, the transmission device is transferred to a safe operating state, in which at least the transmission output shaft can rotate, when an actuating pressure that changes the operating state of the form-locking shift element is detected in the region of the sensor device even though a disengagement control signal was not generated, and/or when the sensor device is associated with at least two form-locking shift elements and the form-locking shift elements are subjected to actuating pressure in order to implement a requested operating state change.

By means of the method according to the invention, when a change in the actuating pressure, for example, a pressure increase, is detected by the sensor device even though the actuation in the region of a form-locking shift element has not changed, faulty operation is detected and the transmission device is transferred to a safe state. This method is based on the knowledge that an impermissible operating state change is taking place in the region of a form-locking shift element or that the mode of operation of the sensor device is impaired or faulty. Furthermore, the method according to the invention easily prevents the situation in which a parallel or simultaneous actuation of at least two form-locking shift elements is prevented in the absence of a check or evaluation, by the sensor, of a requested shift procedure to disengage a form-locking shift element, and a procedure to be carried out to prevent undefined operating states of a transmission device cannot be activated without a corresponding diagnosis, by the sensor device, of the operating state of the transmission device.

In a further variant of the method according to the invention, which can be implemented with relatively simple open-loop and closed-loop control, the transmission device is transferred to the safe operating state when an engaged operating state of the form-locking shift element is detected in the region of the sensor device even though a disengagement control signal was generated.

By means of this variant, during operation of a transmission device, in particular during upshifts or gear-disengagement procedures, a current switching state of a form-locking shift element is detected depending on a disengagement control signal that is present and depending on further redundant information from a sensor device associated with a form-locking shift element, and a reliable distinction is made between an engaged state and a disengaged state. It is therefore possible to always detect, across the entire operating range of the transmission device, whether a form-locking shift element that is involved in the requested operating state change of a transmission device, and that must be transferred into the disengaged operating state for the requested operating state change, is actually in the requested disengaged operating state or not. If it is detected by the monitoring function, on the basis of available sensor information and despite the fact that a disengagement control signal was generated, that the form-locking shift element to be disengaged is in the engaged operating state, the transmission device is transferred to a safe operating state in which at least the transmission output shaft can rotate, thereby preventing an overdetermined gear set at the least and possibly preventing a situation in which power flow cannot be diminished.

In an advantageous variant of the method according to the invention, a timer is started when the disengagement control signal is generated, wherein the transmission device is transferred to the safe operating state when the timer reaches a predefined value and the engaged operating state of the form-locking shift element is detected in the region of the sensor device. It is therefore ensured that conventional shift procedures can be implemented to the conventional extent in a relatively simple manner. If it is detected after expiration of a preferably empirically determined shift time that the form-locking shift element was not transferred to the disengaged operating state to the requested extent, the transmission device is transferred to a safe operating state in order to prevent sustained undefined operating states of a transmission device.

It is thereby possible, for example, to vary the predefined value of the timer depending on various operating parameters, such as the operating temperature of the transmission device or the transmission oil, since shift procedures take longer in transmission devices at relatively low operating temperatures than at relatively high operating temperatures due to the temperature-dependent higher viscosity of the transmission oil.

In a further advantageous variant of the method according to the invention, an operating state change of the form-locking shift element proceeding from the engaged operating state toward the disengaged operating state is detected via the sensor device when a displacement that is equivalent to the requested disengagement procedure of the form-locking shift element can be detected by the sensor device in the region of a shift-element half, which is movable relative to a further shift-element half of the form-locking shift element. This procedure is generally independent of the embodiment of the sensor device, which can be designed, for example, as a displacement sensor, a position sensor, a pressure sensor, or the like.

It is therefore easily possible, for example, to use the sensor device to detect an operating state change of the form-locking shift element proceeding from the engaged operating state toward the disengaged operating state when, during the requested disengagement procedure of the form-locking shift element, a shift-element half to be moved relative to a further shift-element half of the form-locking shift element is in the position equivalent to the disengaged operating state.

As an alternative thereto or cumulatively therewith, in a further advantageous variant of the method according to the invention, which can be implemented in a structurally simple manner, an operating state change of the form-locking shift element proceeding from the engaged operating state toward the disengaged state is detected via the sensor device when an actuating pressure of the form-locking shift element is transitioned from a pressure level equivalent to the engaged operating state of the form-locking shift element to a pressure level at which the form-locking shift element is transferred into the disengaged operating state, wherein the actuating pressure is then at a pressure level that is equivalent to the disengaged operating state.

In a preferred variant of the method according to the invention, the safe operating state of the transmission device corresponds to a neutral operating state, in which the power flow between the transmission input shaft and the transmission output shaft is interrupted, wherein, to this end, all the shift elements of the transmission device are preferably transferred to the disengaged operating state.

As an alternative thereto, the safe operating state is the operating state of the transmission device before the request to engage the form-locking shift element.

As another alternative thereto, in a further advantageous variant of the method according to the invention, the safe operating state is an operating state of the transmission device into which the transmission device transitions when the electrical supply to the transmission device fails, wherein the transmission device is then operated in a so-called mechanical emergency-operating mode.

Depending on the particular application case, the transfer of the transmission device to a safe operating state can take place in a stepped manner under certain circumstances, in which, for example, the transmission device is initially fully disengaged and, after a defined period of time, an attempt is made to return to normal operation by engaging a gear. If a plurality of symptoms occurs during an ignition cycle or, after the transmission is disengaged, if repeated attempts to engage a gear are unsuccessful, the transmission device is finally transferred to a safe state, for example a mechanical emergency-operating mode.

To this end, in an advantageous variant of the method according to the invention, if the transmission device is in the safe operating state in which all shift elements are disengaged, a further timer is started and, once a defined time value has been reached, a request to establish the power flow in the region of the transmission device is generated depending on the operating state.

The transmission device preferably finally transitions into the safe operating state if repeated requests to establish power flow in the region of the transmission device were unsuccessful.

BRIEF DESCRIPTION OF THE DRAWINGS

Further advantages and advantageous developments of the invention will become apparent from the example embodiments, the principle of which is described with reference to the drawings.

In the drawings.

DETAILED DESCRIPTION OF THE PREFERRED EMBODIMENTS

Figures 1, 2:
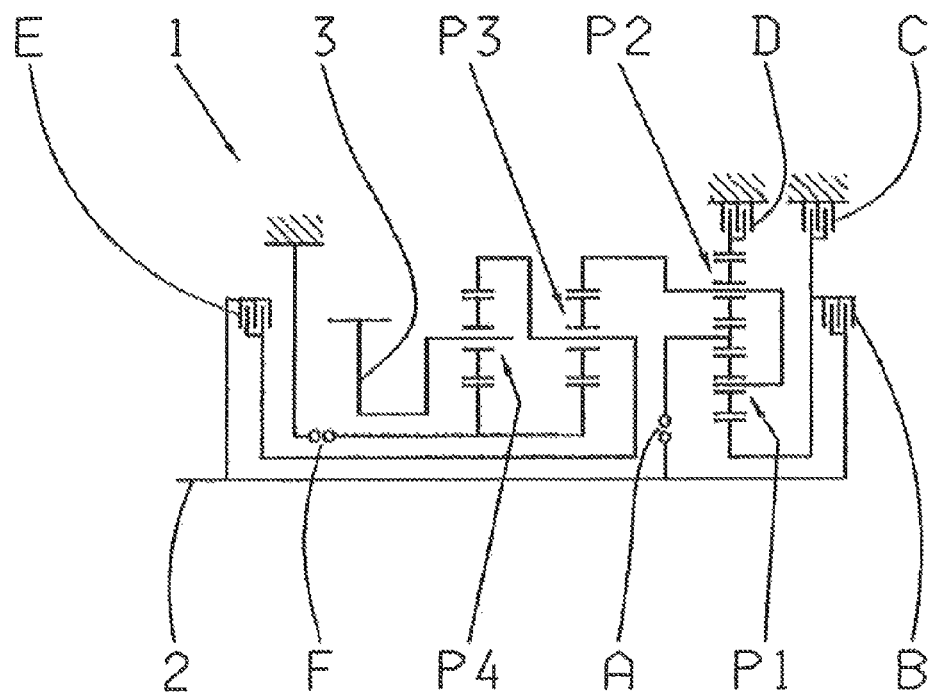
FIG. 1 shows a gear set scheme of a transmission device.
FIG. 2 shows a shift logic, in table form, of the transmission device shown in FIG. 1.

FIG. 1 shows a gearwheel scheme of a transmission device 1 or a 9-speed transmission that is basically known from DE 10 2008 000 429 A1. The transmission device 1 comprises a drive shaft 2 and an output shaft 3 which, in the installed state in a vehicle, is connected to an output drive of the vehicle, while the drive shaft 2 is operatively connected to a drive motor.

The transmission device 1 also comprises four planetary gear sets P1 to P4, wherein the first and second planetary gear sets P1, P2, which are preferably in the form of minus planetary gear sets, form a shiftable, input-side gear set, while the third and fourth planetary gear sets P3 and P4 are the main gear set. The transmission device 1 also comprises six shift elements A to F, of which shift elements C, D and F are designed as brakes, and the shift elements A, B and E are designed as shifting clutches.

Using the shift elements A to F, selective shifting of nine forward gears "1" to "9" and one reverse gear "R" can be attained using the shift logic presented in greater detail in FIG. 2; to establish power flow in the transmission device 1, three shift elements must be moved into an engaged operating state or held there simultaneously in every case.

The shift elements A and F are designed as form-locking shift elements without additional synchronization in the present case, in order to reduce drag torques produced by disengaged, friction-locking shift elements during operation of the transmission device 1 as compared to transmission devices comprising only friction-locking shift elements. Since form-locking shift elements can be transferred from a disengaged operating state to an engaged operating state in general only within a very narrow rotational speed differential band encompassing the synchronous rotational speed, the synchronization of a form-locking shift element to be engaged is implemented without additional structural embodiments by means of a corresponding actuation of the particular shift elements involved in the shifting. This applies for traction shiftings as well as overrun shiftings, wherein the form-locking shift elements can be in the form of claw clutches designed with or without additional synchronization.

Figure 3:
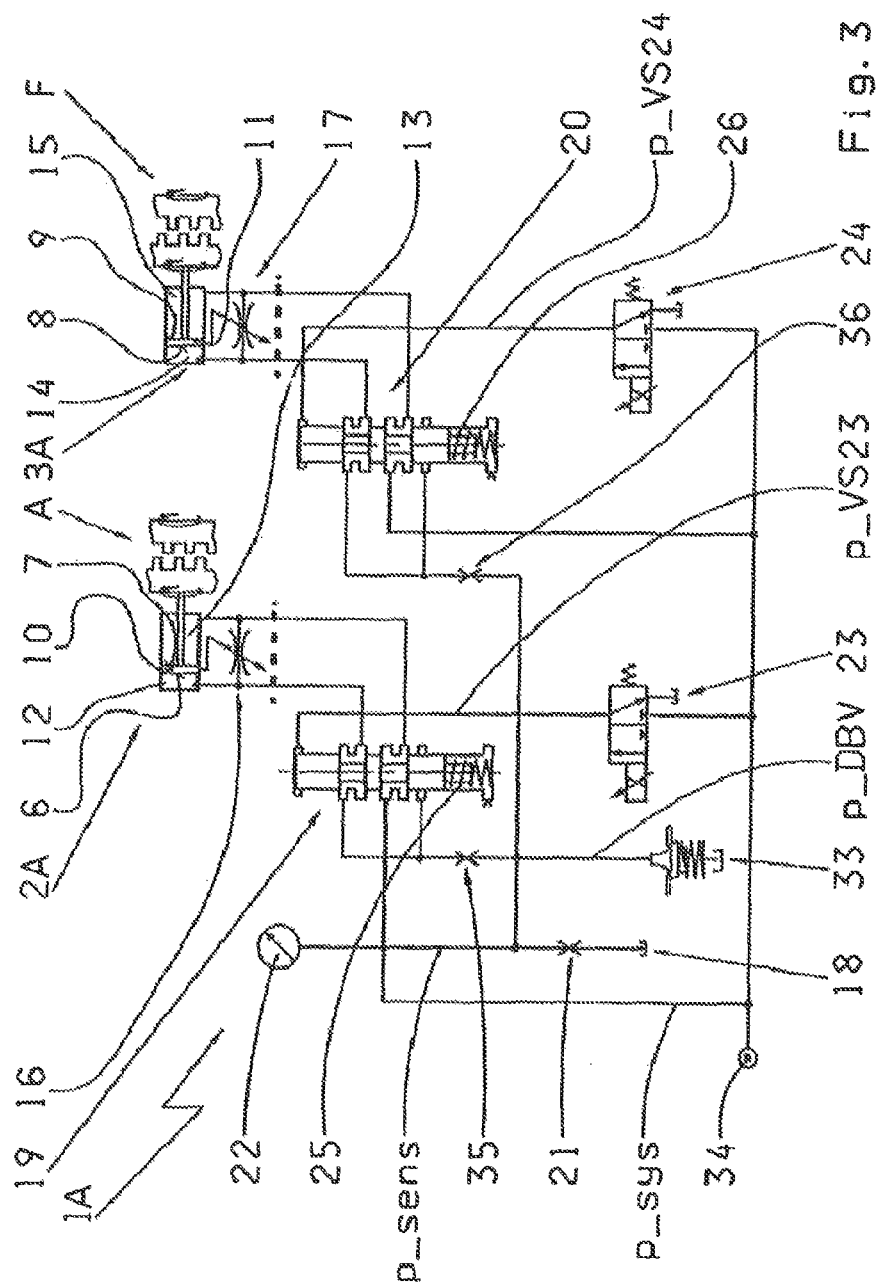
FIG. 3 shows a hydraulic scheme of a device for detecting an operating state of two bidirectionally actuatable hydraulic adjusting devices of shift elements of the transmission device according to FIG. 1.

FIG. 3 shows a hydraulic scheme of a device 1A for detecting an operating state of two bidirectionally actuatable hydraulic adjusting devices 2A, 3A of the shift elements A, F designed as claw shift elements in this case. The actuating devices 2A, 3A can be subjected to hydraulic pressure in the region of each of the effective areas 6, 7 or 8, 9 of a piston element 10, 11, respectively.

When a hydraulic pressure p_sys of a high-pressure region 34 is applied to the piston element 10 or 11 in the region of a first effective area 6 or 8, a force component acting in the direction of a first end position of the piston element 10 or 11 is applied. When the hydraulic pressure p_sys of the high-pressure region 34 is applied to the piston element 10 or 11 at the second effective area 7 or 9, however, a force component acting in the direction of a second end position of the piston element 10 or 11 is applied to the piston element 10 or 11.

Regions 12, 13 or 14, 15, or piston chambers, respectively, which can be subjected to the hydraulic pressure p_sys of the high-pressure region 34 and are associated with the effective areas 6, 7 or 8, 9 of the piston elements 10 or 11, respectively, are connected to one another via a throttle device 16 or 17, respectively, in positions of the piston elements 10, 11 between the end positions. In addition, one of the regions 12 or 13, or 14 or 15 in each case can be coupled to the high-pressure region 34, and the respective other region 13 or 12, or 15 or 14 can be coupled to a low-pressure region 18 in order to adjust a piston element 10 or 11, respectively. Two valve devices 19, 20 are provided for this purpose, in the regions of which the piston chambers 12, 13 or 14, 15, respectively, can each be coupled either to the high-pressure region 34 or the low-pressure region 18.

A further throttle device 21 is provided upstream of the low-pressure region 18 and downstream of the valve devices 19, 20, and a pressure-measuring device 22 is provided, in turn, upstream of the further throttle device 21 and downstream of the valve devices 19 and 20. The valve devices 19 and 20, which are designed as 4/2-directional control valves in this case, can each be subjected to a control pressure p_VS23, p_VS24, which acts against a spring device 25 or 26, respectively, and is supplied from the high-pressure region 34 via an electrohydraulic actuator 23 or 24, respectively, wherein this electrohydraulic actuator is designed as a solenoid valve in this case, in order to subject the adjusting devices 2, 3 to the hydraulic pressure p_sys of the high-pressure region 34, as requested, in the region of the piston chambers 12 and 13 or in the region of the piston chambers 14 and 15, respectively, or to connect these actuating devices to the low-pressure region 18.

Given that a single pressure-measuring device 22 is provided for monitoring the position of the two piston elements 10 and 11, apertures 35, 36 are provided between the hydraulic accumulator 27 and the valve devices 19 and 20, respectively, and between the pressure-limiting valve 33 and the valve devices 19 and 20, respectively, wherein these apertures prevent a mutual influence of the actuating pistons 10 and 11 in the event of actuation.

The end positions of the piston elements 10, 11 can be sensed via the pressure-measuring device 22, which comprises a simple pressure sensor or a pressure switch. In addition, the position sensing ideally takes place in the region of the hydraulic control, wherein all end positions of the piston elements 10 and 11 can be detected by means of a single pressure sensor in the manner described in greater detail in the following.

The piston chambers 12 and 13 or 14 and 15 are connected to one another, depending on position, between the two end positions of the piston elements 10 and 11 via the throttle devices 16 and 17. The throttle devices 16 and 17 or the connections between the piston chambers 12 and 13 or 14 and 15 in the region of the throttle devices 16 and 17, respectively, are released by the piston elements 10 and 11 whenever the piston elements 10 and 11 are not located in the end positions thereof.

As a result, a flow of hydraulic fluid proceeding from the piston chamber 12 or 13, or 14 or 15, which is connected to the high-pressure region 34 via the valve device 19 or 20, respectively, is guided via the throttle devices 16 and 17, in positions of the piston elements 10 and 11 between the end positions, toward the piston chamber 13 or 12, or 15 or 14, respectively, which is coupled to the low-pressure region 18, which is the transmission sump of the transmission device in this case.

In the region of a further throttle device 21, which is a blocking aperture, a back pressure p_sens builds up depending on the throttle cross-section of the further throttle device 21, depending on the leakage flowing from the piston chamber 12 or 13, or 14 or 15 toward the low-pressure region 18, wherein this back pressure is detected using measurement technology in the region of the pressure-measuring device 22.

The device 1A is provided with a pressure-limiting valve 33 downstream of the valve devices 19 and 20 and upstream of the further throttle device 21. The response pressure p_DBV of the pressure-limiting valve 33 is higher than a predefined pressure threshold of the pressure-measuring device 22, at which a malfunction in the region of the adjusting device 2A or 3A is detected via the pressure-measuring device 22. Due to the placement of the pressure-limiting valve 33 upstream of the further throttle device 21, the pressure increases to at least the response pressure p_DBV of the pressure-limiting valve 33 downstream of the valve devices 19 and 20 and upstream of the further throttle device 21 during actuation of the piston element 10 or 11. Once the piston element 10 or 11 reaches the end position, the leakage flow in the region of the throttle device 16 or 17, respectively, is interrupted by the piston element 10 or 11 in the above-described manner, thereby ensuring that the hydraulic pressure p_sens upstream of the further throttle device 21 can no longer reach the pressure level of the response pressure p_DBV of the pressure-limiting valve 33. This results from the fact that the hydraulic system is vented upstream of the valve devices 19 and 20 toward the low-pressure region 18 via the further throttle device 21.

If the piston element 10 does not reach the intended end position, the leakage flow via the throttle device 16 remains great and results in a pressure increase in the region of the blocking aperture 21, until the pressure-limiting valve 33 responds and limits the pressure p_sens in the system. The pressure p_sens in the tank line comprising the further throttle device 21 increases to a level such that the predefined pressure threshold is exceeded in the region of the pressure-measuring device 22 and the electronic transmission control device is acted upon by a signal that corresponds to an erroneous piston position.

The mode of operation of the method according to the invention is explained in greater detail in the following with reference to the graphs of a plurality of operating parameters of the transmission device 1 according to FIG. 1, which are plotted as a function of time t in FIG. 4. The method according to the invention can be used to monitor and actuate the form-locking shift element F during a requested transmission ratio change proceeding from the fourth transmission ratio "4" toward the fifth transmission ratio "5", which is implemented by engaging the friction-locking shift element B and disengaging the form-locking shift element F, and to monitor and actuate the form-locking shift element A in the event of a requested transmission ratio change proceeding from the seventh transmission ratio "7" toward the eighth transmission ratio "8", which is implemented by engaging the friction-locking shift element C and disengaging the form-locking shift element A. Furthermore, the method according to the invention can also be operated in a suitable manner during courses of operating states during which a power flow is interrupted in the region of the transmission device 1 by disengaging the form-locking shift element A and/or F in the form of a so-called gear disengagement, which may be the case, for example, upon entry into a coasting mode of a vehicle comprising the transmission device 1. The method according to the invention can also be used for courses of operating states during which a form-locking shift element is transferred from the engaged operating state to the disengaged operating state in order to implement a requested downshift.

At time T1, the fourth transmission ratio "4" or the seventh transmission ratio "7" for forward travel is engaged in the transmission device 1. At time T1, a request occurs for a transmission ratio change proceeding from the currently engaged actual transmission ratio "4" or "7" toward the fifth transmission ratio "5" or the eighth transmission ratio "8" for forward travel or the target transmission ratio, wherein, to this end, the friction-locking shift element B or the shift element C is engaged and, simultaneously, the form-locking shift element F or the shift element A is transferred from the engaged operating state to the disengaged operating state.

Furthermore, a rotational speed nt of the transmission input shaft at the time T1, at which the friction-locking shift element B or the shift element C is still fully disengaged and the form-locking shift element F or the shift element A is in the fully engaged operating state, and the fourth transmission ratio "4" or the seventh transmission ratio "7" is engaged, corresponds to the synchronous rotational speed nt("4") or nt("7"), respectively, which results when the fourth transmission ratio "4" is engaged or the seventh transmission ratio "7" is engaged in the transmission device 1.

For the purpose of clarity, the method according to the invention is described in greater detail in the following substantially only for the form-locking shift element F, wherein the aforementioned process corresponds to the process provided for actuating and monitoring the form-locking shift element A during a requested transmission ratio change from the seventh transmission ratio "7" toward the eighth transmission ratio "8".

At time T2, at which the shift request proceeding from the actual transmission ratio "4" toward the target transmission ratio "5" is present, the transmission capability of the friction-locking shift element B is increased by raising the actuating pressure accordingly, and so the rotational speed nt of the transmission input shaft 2 decreases starting at a time T3 toward the synchronous rotational speed nt("5"), which results when the fifth transmission ratio "5" is engaged in the transmission device 1. Furthermore, at time T2, which is the beginning of the upshift proceeding from the fourth transmission ratio "4" toward the fifth transmission ratio "5", the point in time is detected before which the synchronous rotational speed nt("5") is reached and at which an actuation of the form-locking shift element F acting in the disengagement direction of the form-locking shift element F must be started.

In this case, a time T4 corresponds to the time that is detected, depending on the operating state, at which the form-locking shift element F must be subjected to the actuating force required for disengagement. At time T4, a profile of the control current IF of the form-locking shift element F, which represents a disengagement-control signal for the form-locking shift element F, therefore abruptly drops in the manner depicted in FIG. 4 in an idealized manner, and the form-locking shift element F is actuated to the desired extent.

Due to the reduction of the control current IF, a profile XF of the status of the form-locking shift element F also abruptly drops to a lower level at time T4, which corresponds to an undefined operating state of the form-locking shift element F, since the pressure p_sens in the region of the pressure-measuring device 22 is substantially zero at time T4 and, therefore, it is not yet possible to verify via the pressure-measuring device 22 or the sensor device whether a corresponding movement in the disengagement direction of the form-locking shift element F has taken place or not.

As the operating time t increases, the rotational speed nt of the transmission input shaft 2 decreases further toward the synchronous rotational speed nt("5") and a torque delivered via the transmission device 1 is transferred to an increasing extent toward the transmission output shaft 3 via the friction-locking shift element B to be engaged. As a result, the torque present at the form-locking shift element F is reduced to an increasing extent and the piston element 11 of the form-locking shift element F is displaced toward the end position, which is equivalent to the disengaged operating state of the form-locking shift element F. The pressure p_sens increases abruptly in the region of the sensor device 22 at time T5, since, starting at time T5, hydraulic fluid proceeding from the high-pressure region 34 can be moved toward the low-pressure region 18 via the form-locking shift element F or the piston element 11 to the above-described extent. At the same time, the XF profile abruptly changes to a status level at time T5 that corresponds to a so-called intermediate position of the piston element 11 between the two end positions thereof.

The pressure p_sens returns substantially to zero at the further time T6, which follows the time T5. This results from the fact that the form-locking shift element F is fully disengaged at time T6 and the connection between the high-pressure region 34 and the low-pressure region 18 is separated in the region of the piston element 11 due to the end position of the piston element 11 having been reached, wherein this end position is equivalent to the disengaged operating state of the form-locking shift element F.

It is therefore possible to clearly detect, on the basis of the profile of the control current IF of the form-locking shift element F and the profile of the pressure p_sens, that the form-locking shift element F has been transferred to the disengaged operating state in the requested manner, wherein the profile of XF abruptly changes, at time T6, to a status level that is equivalent to the disengaged operating state of the shift element F. The transmission capability of the friction-locking shift element B is then guided, in a manner known per se, toward the engagement pressure level, at which the shift element B is in the fully engaged operating state. When the friction-locking shift element B is fully engaged and, simultaneously, the form-locking shift element F is disengaged, the requested transmission ratio change toward the fifth transmission ratio "5" is completed.

For the case in which the form-locking shift element F cannot be transferred to the disengaged operating state to the above-described extent, in order to prevent a sustained operating state of the transmission device, a timer is started at time T4, the value of which is raised cyclically in the manner depicted herein as the operating time t increases, although the value can also be continuously increased.

If the rotational speed nt of the transmission input shaft 2 abruptly drops toward zero at time T3, for example, in the profile shown as a dashed line, because, for example, the gear set of the transmission device 1 is overdetermined due to the engagement of the friction-locking shift element B while, simultaneously, the form-locking shift element F is engaged, the transmission device 1 is immediately transferred to a safe operating state at time T3, in which all the shift elements A to F are disengaged in order to prevent an undefined operating state of the transmission device 1.

Figure 4:
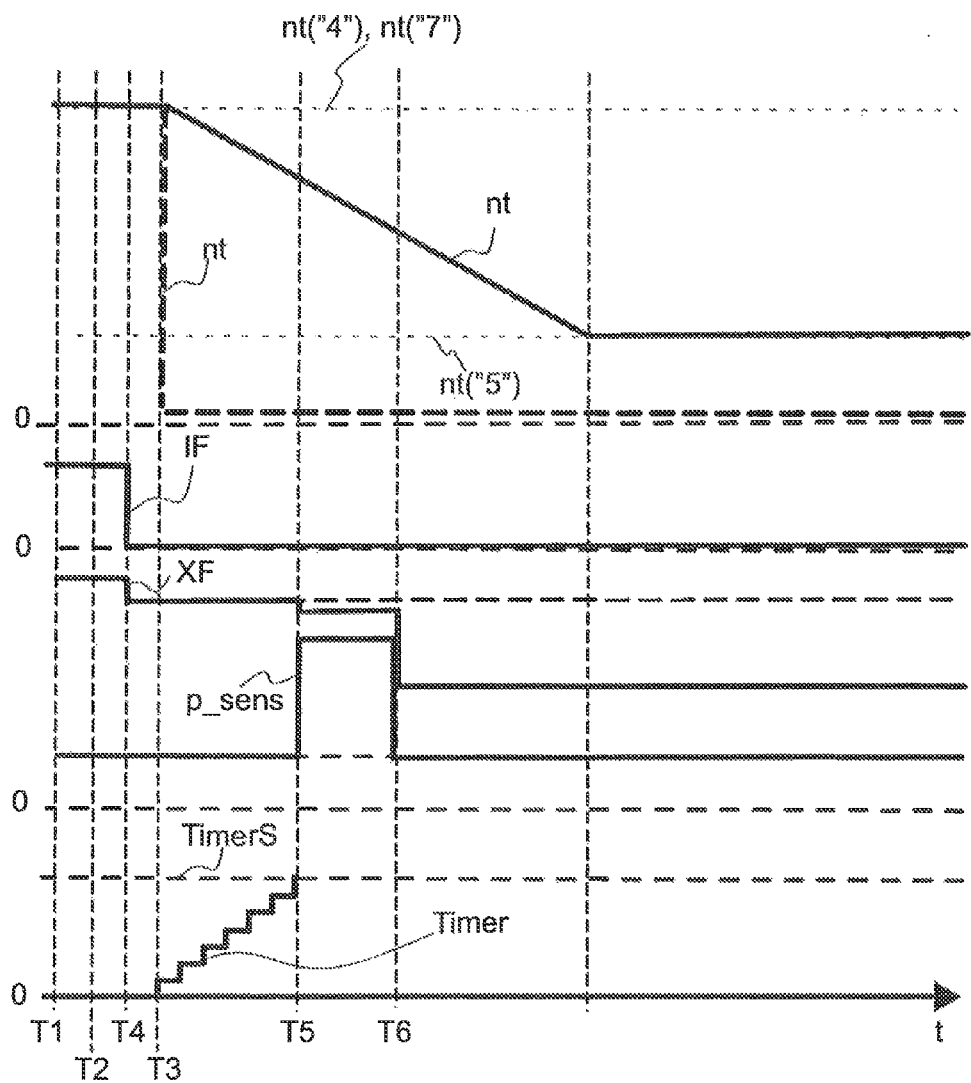
FIG. 4 shows a plurality of graphs of various operating state parameters of the transmission device according to FIG. 1, some of which occur during a properly implemented disengagement procedure and some of which occur during a faulty disengagement procedure of a form-locking shift element of the transmission device.

If the rotational speed nt of the transmission input shaft 2 has a rotational speed profile that is substantially expected and is depicted in FIG. 4 proceeding from the synchronous rotational speed nt("4") toward the synchronous rotational speed nt("5"), and the sensor device 22 detects that the form-locking shift element F was not transferred to the disengaged operating state even though the control current IF of the form-locking shift element F was reduced substantially to zero, at time T4, to the extent shown, the transmission device 1 is transferred to the safe operating state at time T6, at which the timer reaches a predefined value TimerS, wherein, in the safe operating state, at least the transmission output shaft 3 can rotate, in order to easily prevent safety-critical operating states due, for example, to a blocked transmission.

The engaged operating state of the form-locking shift element F is detected in the region of the sensor device 22 when the pressure p_sens does not increase, starting at time T5, to the pressure level of an intermediate position of the piston element 11, to the extent depicted in FIG. 4, or is still at this pressure level after time T6, since it can then be assumed that the form-locking shift element F is not fully disengaged.

Since the sensor device 22 is associated with the form-locking shift element A as well as the form-locking shift element F, it is ensured that, due to the embodiment of the device 1A, only one of the form-locking shift elements A and F can ever be actuated to the above-described extent. If the actuation state of a form-locking shift element A or F is changed such that this undergoes an operating state change in the future, i.e. is transferred from the disengaged or engaged operating state toward the engaged or disengaged operating state, and a pressure increase is then detected in the region of the sensor device 22, the state of the intermediate position of the piston element 10 or 11 is detected in the region of the monitoring function. If, in parallel with this procedure, an actuation state of the further form-locking shift element F or A is requested such that this should also move out of the end position, a fault is detected via the monitoring function and the transmission device 1 is transferred to a safe operating state.

In addition, when a pressure increase is detected in the region of the sensor device 22 without the control current IF having changed, a fault is detected and the transmission device 1 is transferred to a safe operating state, since it can then be assumed that this is either an impermissible operating state change in the region of one of the form-locking shift elements A or F, or that a malfunction exists in the region of the sensor device 22.

The transmission device can be transferred to the safe operating state in a stepped manner depending on the particular application case, wherein the transmission device 1 is initially fully disengaged upon detection of a fault and all shift elements A to F are transferred to the disengaged operating state. After expiration of a defined operating period, a further attempt is made in the transmission device 1 to engage a transmission ratio and transition to normal operation. If a plurality of faults occurs during an ignition cycle or, after the transmission device 1 is disengaged, if repeated attempts to engage a gear are unsuccessful, the transmission device is finally transferred to a safe operating state, which is characterized by a mechanical emergency-operating mode, for example.

REFERENCE CHARACTERS 1 transmission device
1A device
2 transmission input shaft
2A adjusting device
3 transmission output shaft
3A adjusting device
6 effective area
7 effective area
8 effective area
9 effective area
10 piston element
11 piston element
12 piston chamber
13 piston chamber
14 piston chamber
15 piston chamber
16 throttle device
17 throttle device
18 low-pressure region
19 valve device
20 valve device
21 further throttle device, blocking aperture
22 pressure-measuring device
23 electrohydraulic actuator
24 electrohydraulic actuator
25 spring device
26 spring device
27 hydraulic accumulator
28 spring device
29 throttle bore
30 sealing device
31 cylinder wall
32 sealing device
33 pressure-limiting valve
34 high-pressure region
35 aperture
36 aperture
"1" to "9" gear ratio for forward driving
A to F shift element
IF control current of the form-locking shift element F
nt rotational speed of the transmission input shaft
nt("4"), nt("5"),
nt("7"), nt("8") synchronous rotational speeds
p_DBV response pressure of the pressure-limiting valve
p_VS control pressure
p_sens back pressure, sensor pressure
p_sys hydraulic pressure of the high-pressure region
P1 to P4 planetary gear set
"R" gear ratio for travel n reverse
t time
T1 to T6 discrete point of time
Timer profile
TimerS predefined value of the timer
XF graph of the status of the operating state of the form-locking shift element F

The invention claimed is:

1. A method of operating a transmission device (1) which is adjustable to various operating states by actuating shift elements (A to F), at least one of the shift elements (A, F) is a form-locking shift element which is adjusted, from an engaged operating state to a disengaged operating state, so as to implement a defined operating state of the transmission device (1) during which a power flow, between a transmission input shaft (2) and a transmission output shaft (3), is either present or interrupted, a sensor device (22) is associated with the form-locking shift element (A, F), an operating state of the form-locking shift element (A, F) is determinable by the sensor device and, if there is a request to disengage the form-locking shift element (A, F), a disengagement control signal (IF) is generated and the form-locking shift element (A, F) is actuated in a direction of disengagement, depending on the disengagement control signal (IF), the method comprising the steps of:

implementing a shift involving the form-locking shift element (A, F) from one gear to another in the transmission device (1); and transferring the transmission device (1) to a safe operating state in which at least the transmission output shaft (3) is rotatable relative to the input shaft (2), when at least one of:

an actuating pressure, which can change the operating state of the form-locking shift element, is determined in a region of the sensor device (22) even though a disengagement control signal (IF) was not generated, and the sensor device (22) is associated with at least two form-locking shift elements (A, F) and the form-locking shift elements (A, F) are subjected to actuating pressure in order to implement a requested operating state change.

2. The method according to claim 1, further comprising the step of transferring the transmission device (1) to a safe operating state, in which at least the transmission output shaft (3) is rotatable relative to the input shaft (2), when an engaged operating state of the form-locking shift element (A, F) is determined in the region of the sensor device (22) even though a disengagement control signal (IF) was generated.

3. The method according to claim 1, further comprising the steps of starting a timer (Timer) when the disengagement control signal (IF) is generated, transferring the transmission device (1) to the safe operating state when the timer (Timer) reaches a predefined value (TimerS), and determining the engaged operating state of the form-locking shift element (A, F) in the region of the sensor device (22).

4. The method according to claim 1, further comprising the step of determining, via the sensor device (22), an operating state change of the form-locking shift element (A, F) proceeding from the engaged operating state toward the disengaged operating state, when a displacement that is equivalent to the requested disengagement procedure of the form-locking shift element (A, F) is determinable by the sensor device in a region of a shift-element half, which is movable relative to a further shift-element half of the form-locking shift element.

5. The method according to claim 1, further comprising the step of determining, via the sensor device (22), an operating state change of the form-locking shift element (A, F) proceeding from the engaged operating state toward the disengaged operating state, when, during the requested disengagement procedure of the form-locking shift element (A, F), a shift-element half to be moved relative to a further shift-element half of the form-locking shift element (A, F) is in a position equivalent to a disengaged operating state.

6. The method according to claim 1, further comprising the step of determining, via the sensor device (22), an operating state change of the form-locking shift element (A, F) proceeding from the engaged operating state toward the disengaged state when an actuating pressure of the form-locking shift element (A, F) is transitioned from a pressure level equivalent to the engaged operating state of the form-locking shift element (A, F) to a pressure level at which the form-locking shift element (A, F) is transferred to a disengaged operating state, and the actuating pressure is then at a pressure level that is equivalent to the disengaged operating state.

7. The method according to claim 1, further comprising the step of defining the safe operating state of the transmission device (1) as a neutral operating state in which power flow, between the transmission input shaft (2) and the transmission output shaft (3), is interrupted.

8. The method according to claim 1, further comprising the step of defining the safe operating state as the operating state of the transmission device (1) before the request to engage the form-locking shift element (A, F).

9. The method according to claim 1, further comprising the step of defining the safe operating state as an operating state of the transmission device (1) into which the transmission device (1) transitions when an electrical supply to the transmission device (1) fails.

10. The method according to claim 1, further comprising the steps of starting a further timer, if the transmission device (1) is in a safe operating state in which all shift elements (A to F) are disengaged, and, once a defined time value is reached, generating a request to establish the power flow in the region of the transmission device (1) depending on the operating state.

11. The method according to claim 10, further comprising the step of finally transitioning the transmission device into the safe operating state if repeated requests to establish the power flow, in the region of the transmission device (1), were unsuccessful.

12. A method of operating a 9-speed transmission device (1) which is shiftable to various operating states by actuating shift elements (A to F), at least one of the shift elements (A, F) is a form-locking shift element and is engageable and disengageable so as to implement a defined operating state of the transmission device (1) during which a power flow, between a transmission input shaft (2) and a transmission output shaft (3), is either present or interrupted, a sensor device (22) associated with the form-locking shift element (A, F) determines an operating state of the form-locking shift element (A, F) and, if a request to disengage the form-locking shift element (A, F) is detected, a disengagement control signal (IF) is generated and the form-locking shift element (A, F) is actuated in a disengagement direction, depending on the disengagement control signal (IF), the method comprising the steps of:

implementing a shift involving the form-locking shift element (A, F) from one gear to another in the transmission device (1); and shifting the transmission device (1) to a safe operating state in which at least the transmission output shaft (3) is rotatable relative to the input shaft (2), when at least one of:

the sensor device (22) determines an actuating pressure that is sufficient to change the operating state of the form-locking shift element even though no disengagement control signal (IF) is generated, and when the sensor device (22) is associated with at least two form-locking shift elements (A, F) and the at least two form-locking shift elements (A, F) are subjected to an actuating pressure that is sufficient to implement a requested operating state change.

* * * * *